Patented June 14, 1949

2,473,463

UNITED STATES PATENT OFFICE 2,473,463

ALKYLATED MELAMINE-FORMALDEHYDE LIQUID COMPOSITIONS

Pierrepont Adams, Glenbrook, Conn., assignor to American Cyanamid Company, New York, N. Y., a corporation of Maine No Drawing. Application May 22, 1947, Serial No. 749,885

12 Claims. (Cl. 260—67.6)

This application is a continuation-in-part of my copending application Serial No. 455,527, filed August 20, 1942 and now abandoned.

This invention relates to the preparation of alkylated melamine-formaldehyde liquid compositions. More particularly it relates to an improved method of preparing an alkylated melamine-formaldehyde liquid composition or varnish which comprises effecting reaction, more particularly under heat and at a temperature up to and including the boiling temperature of the reaction mass, between ingredients comprising (1) methanol, (2) melamine and (3) formaldehyde, more particularly an aqueous solution of formaldehyde the melamine and formaldehyde being employed in the ratio of from about 2 to not more than 3½ (about 3½), more particularly about 3, moles of formaldehyde per mole of melamine, and effecting reaction between (a) the resulting methylated melamine-formaldehyde reaction product and (b) an alcohol of the class consisting of propanols and primary and secondary butanols, specifically n-propanol, isopropanol, n-butanol, isobutanol and sec.-butanol. Thus, at least part of the reaction between the aforesaid ingredients of (1), (2) and (3) may be effected while distilling alcohols from the reaction mass and in the presence of an alcohol of (b). In this way methyl radicals in the reaction product of (a) are replaced by alkyl radicals corresponding to the alcohol of (b) employed and an ungelled, homogeneous or substantially homogeneous, liquid composition comprising an alkylated melamine-formaldehyde resin having a low ratio of formaldehyde to melamine is obtained.

In the past, melamine-aldehyde condensation products have been prepared by effecting reaction between melamine and various proportions of aldehydes. For instance, it has been suggested that such products be prepared utilizing melamine and formaldehyde in molar ratios varying from 1 mole of the former to from 1 to about 20 moles of the latter. However, in the preparation of propylated and butylated melamine-formaldehyde liquid compositions, the conventional method of producing such compositions by adding propanol or butanol to a solution or partial reaction product of melamine and formaldehyde and effecting reaction between the ingredients by distilling alcohol and water from the resulting reaction mass has been limited to those cases wherein melamine and formaldehyde were employed in the ratio of 1 mole of the former to substantially more than 3½ moles, specifically 5 or 6 moles, of the latter. Such mole ratios of formaldehyde to melamine have been necessary because the reaction mass gels or tends to gel (or precipitates resin from solution) when effort is made to prepare a propylated or butylated melamine-formaldehyde liquid composition using substantially less than 3½ moles, specifically 2 or 3 moles, of formaldehyde per mole of melamine. Since for economic and other reasons (e. g., in order to obtain a product having a lesser odor of formaldehyde and other improved properties) it is desirable to use the minimum amount of formaldehyde that will provide a heat-curable or thermosetting, propylated or butylated melamine-formaldehyde liquid composition which does not gel (or precipitate resin from solution) during its preparation or prior to use, it is apparent that any means of reducing the amount of formaldehyde required and yet obtaining a product having the aforementioned general characteristics is a matter of considerable practical importance.

I am aware of the fact that it was suggested prior to my invention, e. g., in Widmer et al. U. S. Patent No. 2,197,357 and in the corresponding British Patent No. 486,577, to use methyl alcohol or a mixture of ethyl alcohol and 2-ethylhexanol as a reactant with hexamethylol melamine, which is a product of reaction of 1 mole of melamine and 6 moles of formaldehyde. As indicated hereinbefore, no gelation or other problems are involved in producing a liquid composition comprising an alkylated melamine-formaldehyde resin when the formaldehyde is employed in an amount corresponding to substantially more than 3½ moles, e. g., 6 moles, of formaldehyde per mole of melamine.

The present invention is based on my discovery that ungelled liquid compositions comprising a member of the group consisting of propylated and primary and secondary butylated melamine-formaldehyde resins having a low ratio of formaldehyde to melamine, more particularly having a ratio of from about 2 to not more than about 3½, and specifically from about 2 to about 3, moles of formaldehyde per mole of melamine can be produced as broadly described in the first paragraph of this specification and more specifically hereafter. That such results could be obtained was quite surprising and unexpected and in no way could have been predicted from the teachings in the prior art as exemplified by the aforementioned Widmer et al. patent and British patent.

One suitable method of practicing my invention comprises distilling alcohols from a reaction mass containing (1) methanol, (2) melamine and (3) formaldehyde, more particularly an aqueous solution of formaldehyde containing, for example, about 37% by weight of HCHO, the amount of methanol of (1) employed being at least sufficient for substantial methylation of the melamine-formaldehyde reaction product. In all cases the melamine and formaldehyde are employed in the ratio of from about 2 moles to not more than about 3½ moles, more particularly about 3 moles, of formaldehyde per mole of melamine and at least part of the distillation, which in some cases may be all of the distillation, is effected in the presence of (4) an alcohol of the group consisting of propanols and primary and secondary butanols. Although all of the propanol or butanol to be employed may be added to the methanol-containing reaction mass at the beginning of the reaction or after a methylated melamine-formaldehyde reaction product has been obtained, a more convenient practice is to introduce only a portion of the higher alkyl alcohol with the other reactants and then add to the reaction mass during the distillation more of the propanol or butanol reactant in a suitable amount, e. g., in an amount corresponding approximately to the amount of alcohols distilled from the mass, or in an amount such as will maintain the volume of the reaction mass approximately constant. As is pointed out more fully in the paragraph which follows and as shown by the examples, the alcohol of (4) may be employed in an amount which is in excess of the theoretical amount required for substantially complete replacement of the methyl groups of the methylated melamine-formaldehyde reaction product with alkyl groups corresponding to the alcohol of (4) employed. By means of the aforementioned technique, the propanol (normal or isomeric propanol) or butanol (primary butanol, e. g., n-butanol, or secondary butanol) is caused to react with the melamine-formaldehyde reaction product and an ungelled, homogeneous or substantially homogeneous liquid composition comprising an alkylated melamine-formaldehyde resin having a low ratio of formaldehyde to melamine is obtained.

If desired, a liquid composition comprising a substantially completely methylated melamine-formaldehyde reaction product wherein the ratio of formaldehyde to melamine is from about 2 to not more than about 3½ moles of the former per mole of the latter may first be prepared, and this product then may be distilled with an excess (that is, an excess over the theoretical amount required for complete or substantially complete replacement of the methyl groups with higher alkyl groups) of a propanol or of a primary or secondary butanol, thereby to obtain an ungelled liquid composition comprising an alkylated melamine-formaldehyde resin. For example, I may distill excess methyl alcohol, as well as water, from a reaction mass containing (a) methanol and (b) a partial reaction product of melamine and formaldehyde, more particularly an aqueous solution of formaldehyde, in the ratio of 1 mole of the former to from about 2 to about 3 moles of the latter. (The melamine-formaldehyde partial reaction product is prepared, for example, by heating a mixture of melamine and an aqueous solution of formaldehyde at a suitable temperature, e. g., at 60° to 90° C., until a clear solution has been obtained.) More methanol is added during the distillation in a suitable amount, for instance in an amount corresponding approximately to the amount of methanol distilled from the reaction mass, and the reaction is caused to proceed until part or, if desired, substantially all of the water has been removed and a liquid composition comprising a methylated melamine-formaldehyde resinous reaction product has been obtained. Thereafter either a propanol, a primary butanol (e. g., n-butanol), a secondary butanol or a mixture thereof is added to the reaction mass and alcohols (methyl alcohol and a propanol or a primary or secondary butanol) are distilled therefrom, more of the higher boiling alcohol being added during the distillation in the same manner as described above with reference to the addition of methanol. The reaction can be carried to completion without gelation, that is, the mass does not form a solid gel or separate into two phases with the precipitation of a resin during the alkylation reaction, in the course of which reaction any water that may be present or may be formed is removed from the reaction mass and some or substantially all of the methyl radicals in the methylated melamine-formaldehyde reaction product are replaced by alkyl radicals corresponding to the higher alcohol employed. Furthermore, gelation or precipitation of resin does not occur when the addition of the higher alcohol has been stopped and the liquid composition is concentrated at atmospheric pressure or, preferably, under reduced pressure, e. g., a pressure as low as 100 mm., thereby to obtain a liquid composition having a desired higher content of resin solids.

Alternatively, the ungelled liquid compositions or varnishes, which sometimes are designated as "lacquers," may be prepared by adding both (1) methanol and (2) a propanol or a primary butanol (e. g., n-butanol) or a secondary butanol, or a mixture thereof to a solution containing a partial reaction product of melamine and formaldehyde which has been prepared as described in the preceding paragraph. Excess alcohols, as well as water, are distilled from the resulting reaction mass, more of the higher alcohol being added thereto during the distillation, e. g., in an amount corresponding approximately to the amount of alcohols distilled therefrom. In this way the higher alcohol, e. g., n-butanol, is caused to react with a product of reaction of ingredients comprising melamine and formaldehyde and an ungelled, homogeneous or substantially homogeneous, liquid composition comprising an alkylated melamine-formaldehyde resin having a low ratio of formaldehyde to melamine is obtained. This liquid composition also can be concentrated, without gelation or precipitation of resin, in the same manner as above described to obtain a liquid product or varnish having a desired higher content of resin solids.

The melamine-formaldehyde partial reaction product may be prepared under acid, alkaline or neutral conditions. The alkylation reaction is effected under acidic conditions, e. g., at a pH of about 5 to about 6.5. Ordinarily, the formaldehyde employed, e. g., formalin, contains sufficient formic acid to provide a suitable acidity in the reaction mass during the alkylation. The mass may be further acidified, if desired or necessary, with such organic or inorganic acids as, for example, acetic acid, citric acid, phosphoric acid, hydrochloric acid, etc.

The liquid compositions or varnishes produced alcohol and water) was being evolved from the reaction mass so that the volume of the latter was maintained approximately constant. This distillation required about 3 hours, during which time approximately 1000 parts of distillate (methyl alcohol and water) was collected.

The distillation was continued, but n-butanol instead of methanol was now added to the liquid reaction mass comprising a methylated melamine-formaldehyde resin in the same manner as described above with reference to the addition of the methanol. Distillation was continued in this manner for about 2 more hours, during which time a total of 600 parts of n-butanol was added and about 600 parts of distillate was collected. The ungelled liquid composition was concentrated by heating under reduced pressure for 25 minutes until about 250 parts of additional distillate had been collected. No gelation occurred during the vacuum concentration nor on cooling, and the resin did not precepitate from either the hot or cold solution. The final product was a clear, water-white, substantially anhydrous, liquid composition or varnish containing about 252 parts of resin solids.

*Example 4*

Essentially the same procedure was followed as described under Example 3 with the exception that in this case 203 parts of a 37% aqueous solution of formaldehyde was used instead of 243 parts; that is, the formaldehyde was used in the ratio of about 2½ moles thereof per mole of melamine. No gelation took place either during the distillation or vacuum concentration, and a clear, water-white, substantially anhydrous, liquid composition or varnish containing about 243 parts of resin solids was obtained. The resin did not precipitate from either the hot or cold solution.

*Example 5*

|  | Parts | Approximate Molar Ratio |
|---|---|---|
| Melamine | 252 | 1 |
| Aqueous solution of formaldehyde (approx. 37% HCHO) | 486 | 3 |
| Methanol | 400 | |
| n-Butanol | 1,400 | |

The melamine and aqueous formaldehyde were mixed and warmed to yield a clear solution containing a partial reaction product of melamine and formaldehyde, after which a mixture of 400 parts of methanol and 400 parts of n-butanol was added. Distillation of the resulting reaction mass at atmospheric pressure was then started, the remainder of the butanol being added from time to time, as distillation proceeded, at about the same rate as distillate was being collected. In this way the volume of the reaction mass was maintained approximately constant. The distillation required about 2 hours, during which time approximately 1000 parts of distillate (methyl alcohol, n-butyl alcohol and water) was obtained. The ungelled liquid composition was concentrated by heating under reduced pressure, no gelation occurring during this vacuum concentration nor on cooling, and the resin did not precipitate from either the hot or cold solution. The final product was a clear, water-white, substantially anhydrous, liquid composition or varnish containing about 494 parts of resin solids.

The following example illustrates the results obtained when an attempt is made to use ethanol instead of methanol in a method such as is described under Example 4.

*Example 6*

|  | Parts | Approximate Molar Ratio |
|---|---|---|
| Melamine | 63.0 | 1.0 |
| Aqueous solution of formaldehyde (approx. 37% HCHO) | 101.5 | 2.5 |
| Ethanol | 542.0 | |
| n-Butanol | (¹) | (¹) |

¹ Resin precipitated and the reaction was discontinued before any n-butanol could be added.

The melamine and aqueous formaldehyde were mixed and warmed for 16 minutes, yielding a clear solution containing a partial reaction product of melamine and formaldehyde, after which 150 parts of ethanol was added. Distillation at atmospheric pressure and the addition of more ethanol was then started. The ethanol was added at about the same rate as distillate was being collected. After distilling for about 2 hours at about 77° C., during which time about 294 parts of ethanol had been added to the reaction mass, the resin began to precipitate. Distillation was continued for approximately another 30 minutes at the same temperature, during which period 98 parts more ethanol was added. Most of the resin by this time had precipitated as a viscous second phase, and the reaction therefore was discontinued.

The results of this example clearly demonstate the non-equivalency of ethanol and methanol in carrying the present invention into effect.

From a consideration of Examples 3, 4 and 5 it will be apparent that the yield of alkylated melamine-formaldehyde resin obtained is not appreciably affected by the amount of methanol used. Although the amount of methanol employed may be widely varied, in general it is advantageous not to use any more than is required in order to obtain the desired results, since it has been found that varnishes or lacquers which have been made with the lower amounts of methanol are more compatible with hydrocarbon solvents (e. g., xylene, mineral spirits, etc.), that is, they have greater tolerance for hydrocarbon solvents, and also yield somewhat harder films, than varnishes in the preparation of which higher amounts of methanol have been employed. The liquid compositions or varnishes produced in accordance with the present invention generally yield films of equal or greater hardness than films of a corresponding propylated or butylated melamine-formaldehyde varnish in which substantially more than 3½ moles, specifically 5 or 6 moles, of formaldehyde per mole of melamine have been employed.

Any desired pigment, dye, lake or filler may be admixed with the alkylated melamine-formaldehyde reaction or condensation products, examples of which are Sudan IV, toluidine red, ochre, red oxide, zinc oxide, titanium dioxide, nigrosine, wood flour, wood fiber, paper dust, clay, zein, glass wool, mica, granite dust, silk flock, cotton flock, silicon carbide, paper, cloth, sand, etc.

Similarly, the reaction or condensation products produced in accordance with the present invention may be modified, if desired, with natural resins or with other synthetic resins or other materials in order to obtain products which are especially suitable for a particular service application. Examples of modifying agents that may in accordance with the present invention may be concentrated or diluted to yield products having any desired content of resin solids, e. g., from 10 to 85% by weight of resin solids based on the weight of the liquid resin. The content of resin solids is determined, for example, by heating in a weighed Petri dish from 0.9 to 1.1 grams of the varnish, to which has been added 5 cc. of xylene and the dish rotated until a homogeneous solution results. The dish is heated for 2 hours at 105° C., the weight of the remaining "resin solids" is recorded and the percentage thereof calculated.

In general, the liquid compositions produced in accordance with the present invention are superior, e. g., in hardness, and especially when approximately the same baking temperatures are used, to those in which a higher ratio of formaldehyde to melamine is employed. Furthermore, the former varnishes can be baked at lower temperatures than those made from the corresponding propylated or butylated melamine-formaldehyde resins in which the ratio of formaldehyde to melamine is substantially more than 3½ moles, e. g., 5 or 6 moles of the former per mole of the latter, and yet obtain films which are equally as hard and in many cases harder than those made from the corresponding resins having a higher ration of formaldehyde to melamine. Since films of equal or better quality are obtainable at a lower baking temperature, a considerable cost savings is effected in the commercial utilization of the varnishes secured by practicing my invention. Another advantage accruing from my invention is that varnishes are obtained in which there is less free formaldehyde and hence less odor of formaldehyde during use of the varnish than those made with a higher ratio of formaldehyde to melamine.

The following examples illustrate the results obtained when effort is made to use conventional technique in the preparation of alkylated melamine-formaldehyde resins having a low ratio of formaldehyde to melamine. All parts are by weight.

*Example 1*

This example illustrates the results of an attempt to prepare a useful varnish comprising a primary butylated, specifically n-butylated, melamine-formaldehyde resin wherein the ratio of formaldehyde to melamine is substantially less than 3½ moles, more particularly about 3 moles, of the former per mole of the latter.

|  | Parts | Approximate Molar Ratio |
| --- | --- | --- |
| Melamine | 168 | 1 |
| Aqueous solution of formaldehyde (approx. 37% HCHO) | 314 | 3 |
| n-Butanol | 1,000 |  |

The aqueous solution of formaldehyde was heated to 70° C. and the melamine was slowly added thereto over a period of about 5 minutes. After heating for an additional 25 minutes to 82° C., the addition of 500 parts of n-butanol to the partial reaction product of melamine and formaldehyde produced by this initial heating of the said reactants was started, and distillation at atmospheric pressure was begun. After heating for 20 minutes more at 82° to 91° C., the reaction mass became slightly cloudy indicating that an insoluble resinous material was forming. After heating for an additional 30 minutes at 91°–92° C., all of the remaining 500 parts of n-butanol by that time having been added, the mass became so cloudy and viscous due to the formation of a high-molecular-weight resin having low solubility in butanol that it was discarded. Such a product obviously would not be suitable for use as a varnish.

Similar results were obtained when the pH of the aqueous formaldehyde was adjusted to 6.5 with triethanolamine before adding the melamine. After heating the melamine-formaldehyde reaction mass for 55 minutes at 25°–86° C., the addition of 500 parts of n-butanol was started. Distillation was continued at atmospheric pressure for 40 minutes at 86°–91° C. while adding more of the butanol from time to time. Distillation was continued for 40 minutes at 91°–92° C., but the mass gelled during attempted distillation at reduced pressure and it was discarded.

*Example 2*

|  | Parts | Approximate Molar Ratio |
| --- | --- | --- |
| Melamine | 168.0 | 1.0 |
| Aqueous solution of formaldehyde (approx. 37% HCHO) | 378.0 | 3.5 |
| Phosphoric acid (85%) | 2.25 |  |
| n-Butanol | 1,000.0 |  |

Essentially the same procedure was followed as described under Example 1 with the exception that 2.25 parts of 85% phosphoric acid was added to the mixture of melamine and formaldehyde, and the acidified mass was refluxed to form the melamine-formaldehyde partial reaction product. Thereafter the butanol was added, and an azeotropic distillation of the water and the excess butanol was effected. The reaction mass gelled during distillation under reduced pressure and was discarded.

When the procedure was repeated, but the melamine-formaldehyde partial reaction product was formed by refluxing the reactants under alkaline conditions, then adding the phosphoric acid-modified butanol to the reaction mass and distilling to remove water and excess alcohol, a product was obtained from which a resin insoluble in butanol precipitated on cooling.

The following examples are given in order that those skilled in the art better may carried into effect and are given by way of illustration and not by way of limitation. All parts are by weight.

*Example 3*

|  | Parts | Approximate Molar Ratio |
| --- | --- | --- |
| Melamine | 126 | 1 |
| Aqueous solution of formaldehyde (approx. 37% HCHO) | 243 | 3 |
| Methanol | 1,300 |  |
| Butanol | 600 |  |

The melamine and aqueous formaldehyde solution were mixed and warmed to yield a clear solution containing a partial reaction product of melamine and formaldehyde, after which 300 parts of methanol was added. Distillation of the resulting reaction mass at atmospheric pressure was then started. The remainder of the methanol was added from time to time, as distillation proceeded, at about the same rate as volatile matter (methyl be employed are shellac, cellulose esters and ethers, urea-aldehyde resins (e. g., urea-formaldehyde resins), phenol-aldehyde resins (e. g., phenol-formaldehyde resins), alkyd resins, ester gums, etc.

For many purposes such, for instance, as in the production of coating compositions, the products resulting from the methods of the present invention are preferably blended with alkyd resins, more particularly drying oil acid-modified alkyd resins. In some cases it may be desirable to use alkyd resins modified with fatty oils or fatty oil acids which are not strictly drying oils or acids derived therefrom.

The alkylated melamine-formaldehyde resins produced as hereinbefore described are suitable for a wide variety of industrial applications such as in the preparation of coating compositions, in various textile-treating and finishing processes, in the coating and impregnation of paper, leather, etc., and as adhesives or binding agents in the production of various molded and laminated articles.

I claim:

1. The method of preparing an alkylated melamine-formaldehyde liquid composition which comprises distilling alcohols from a reaction mass containing (1) methanol, (2) melamine and (3) an aqueous solution of formaldehyde, the melamine and formaldehyde being employed in the ratio of from about 2 to about 3 moles of formaldehyde per mole of melamine, at least part of the distillation being effected in the presence of a primary butanol, and more primary butanol being added to the said reaction mass during the distillation in an amount corresponding approximately to the amount of alcohol distilled from the said mass, whereby the primary butanol is caused to react with the melamine-formaldehyde reaction product and an ungelled liquid composition comprising an alkylated melamine-formaldehyde resin having a low ratio of formaldehyde to melamine is obtained, the amount of methanol of (1) employed being at least sufficient for substantial methylation of the melamine-formaldehyde reaction product and the total amount of primary butanol employed being in excess of the theoretical amount required for substantially complete replacement of the methyl groups of the methylated melamine-formaldehyde reaction product with primary butyl groups.

2. The method of preparing an alkylated melamine-formaldehyde liquid composition which comprises adding methanol and n-butanol to a solution containing a partial reaction product of melamine and an aqueous solution of formaldehyde, the melamine and formaldehyde being employed in the ratio of from about 2 to about 3 moles of formaldehyde per mole of melamine, distilling excess alcohols from the resulting reaction mass, adding more n-butanol to the said reaction mass during the distillation in an amount corresponding approximately to the amount of alcohols distilled from the said mass, whereby the n-butanol is caused to react with a product of reaction of ingredients comprising melamine and formaldehyde and an ungelled liquid composition comprising an alkylated melamine-formaldehyde resin having a low ratio of formaldehyde to melamine is obtained, the amount of methanol employed being at least sufficient for substantial methylation of the said partial reaction product of melamine and aqueous solution of formaldehyde and the total amount of n-butanol employed being in excess of the theoretical amount required for substantially complete replacement of the methyl groups of the methylated melamine-formaldehyde reaction product with n-butyl groups.

3. A method as in claim 2 which includes the additional step of concentrating the ungelled liquid composition comprising an alkylated melamine-formaldehyde resin by heating the said composition until an ungelled liquid composition of a desired higher content of resin solids has been obtained.

4. The method of preparing an n-butylated melamine-formaldehyde liquid composition which comprises (1) distilling excess methyl alcohol from a reaction mass containing (a) methanol and (b) a partial reaction product of melamine and an aqueous solution of formaldehyde, the melamine and formaldehyde being employed in the ratio of from about 2 to about 3 moles of formaldehyde per mole of melamine, more methanol being added during the distillation in an amount corresponding approximately to the amount of methanol distilled from the said reaction mass, and the reaction being caused to proceed until a liquid composition comprising a methylated melamine-formaldehyde reaction product has been obtained, (2) adding n-butanol to the resulting product, and (3) distilling alcohols from the n-butanol-modified composition, more n-butanol being added thereto during the distillation in an amount corresponding approximately to the amount of alcohols distilled, whereby methyl radicals in the methylated melamine-formaldehyde reaction product are replaced by n-butyl radicals and an ungelled liquid composition comprising an n-butylated melamine-formaldehyde resin having a low ratio of formaldehyde to melamine is obtained, the total amount of methanol employed being at least sufficient for substantial methylation of the said melamine-formaldehyde partial reaction product of (b) and the total amount of n-butanol employed being in excess of the theoretical amount required for substantially complete replacement of the methyl groups of the methylated melamine-formaldehyde reaction product with n-butyl groups.

5. A method as in claim 4 which includes the additional step of concentrating the ungelled liquid composition comprising an n-butylated melamine-formaldehyde resin by heating the said composition until an ungelled liquid composition of a desired higher content of resin solids has been obtained.

6. The method of preparing an n-butylated melamine-formaldehyde liquid composition which comprises mixing together melamine and an aqueous solution of formaldehyde in the ratio of 1 mole of the former to 3 moles of the latter, warming the mixture whereby a clear solution containing a partial reaction product of melamine and formaldehyde is obtained, adding methanol to the said clear solution, initiating distillation of the resulting mass at atmospheric pressure, adding more methanol to the reaction mass as distillation proceeds at about the same rate as volatile matter comprising methyl alcohol and water is being evolved from the reaction mass so that the volume of the latter is maintained approximately constant, continuing the distillation while thus adding methanol for a period sufficient to form a liquid reaction mass comprising a methylated methylol melamine reaction product, discontinuing the addition of methanol to the reaction mass, adding n-butanol to the said mass, distilling alcohols from the n-butanol-modified composition, more n-butanol being added thereto during the distillation in an amount corresponding approximately to the amount of alcohols distilled, whereby methyl radicals in the methylated melamine-formaldehyde reaction product are replaced by n-butyl radicals and an ungelled liquid composition comprising an n-butylated melamine-formaldehyde resin having a low ratio of formaldehyde to melamine is obtained, the total amount of methanol employed being at least sufficient for substantial methylation of the said partial reaction product of melamine and formaldehyde and the total amount of n-butanol employed being in excess of the theoretical amount required for substantially complete replacement of the methyl groups of the said methylated methylol melamine reaction product with n-butyl groups, and concentrating the said ungelled liquid composition by heating under reduced pressure until an ungelled liquid composition of a desired higher content of resin solids has been obtained.

7. A method as in claim 6 wherein the melamine and aqueous solution of formaldehyde are employed in the ratio of 1 mole of the former to 2½ moles of the latter.

8. The method of preparing an alkylated melamine-formaldehyde liquid composition which comprises effecting reaction under heat and at a temperature up to and including the boiling temperature of the reaction mass between ingredients comprising (1) methanol, (2) melamine and (3) an aqueous solution of formaldehyde, the melamine and formaldehyde being employed in the ratio of from about 2 to not more than 3½ moles of formaldehyde per mole of melamine, at least part of the reaction between the aforesaid ingredients being effected while distilling alcohols from the reaction mass containing the same and in the presence of (4) an alcohol of the group consisting of propanols and primary and secondary butanols, whereby the alcohol of (4) is caused to react with the melamine-formaldehyde reaction product and an ungelled liquid composition comprising an alkylated melamine-formaldehyde resin having a low ratio of formaldehyde to melamine is obtained, the amount of methanol of (1) employed being at least sufficient for substantial methylation of the melamine-formaldehyde reaction product and the amount of the alcohol of (4) employed being in excess of the theoretical amount required for substantially complete replacement of the methyl groups of the methylated melamine-formaldehyde reaction product with alkyl groups corresponding to the alcohol of (4) employed.

9. A method as in claim 8 wherein the alcohol of (4) is a propanol.

10. A method as in claim 8 wherein the alcohol of (4) is a primary butanol.

11. The method of preparing an alkylated melamine-formaldehyde liquid composition which comprises distilling alcohols from a reaction mass containing (1) methanol, (2) melamine and (3) an aqueous solution of formaldehyde, the melamine and formaldehyde being employed in the ratio of from about 2 to about 3 moles of formaldehyde per mole of melamine, at least part of the distillation being effected in the presence of (4) an alcohol of the group consisting of propanols and primary and secondary butanols, whereby the alcohol of (4) is caused to react with the melamine-formaldehyde reaction product and an ungelled liquid composition comprising an alkylated melamine-formaldehyde resin having a low ratio of formaldehyde to melamine is obtained, the amount of methanol of (1) employed being at least sufficient for substantial methylation of the melamine-formaldehyde reaction product and the amount of the alcohol of (4) employed being in excess of the theoretical amount required for substantially complete replacement of the methyl groups of the methylated melamine-formaldehyde reaction product with alkyl groups corresponding to the alcohol of (4) employed.

12. The method of preparing an n-butylated melamine-formaldehyde liquid composition which comprises mixing together melamine and an aqueous solution of formaldehyde containing approximately 37% HCHO in a weight ratio of 126 parts of the former to 243 parts of the latter, warming the mixture whereby a clear solution containing a partial reaction product of melamine and formaldehyde is obtained, adding methanol to the said clear solution in a weight ratio of 300 parts of methanol to 126 parts of melamine used in forming the said partial reaction product of melamine and formaldehyde, initiating distillation of the resulting mass at atmospheric pressure, adding more methanol to the reaction mass as distillation proceeds at about the same rate as volatile matter comprising methyl alcohol and water is being evolved from the reaction mass so that the volume of the latter is maintained approximately constant, continuing the distillation while thus adding methanol for a period of about 3 hours whereby there is obtained a liquid reaction mass comprising a methylated methylol melamine reaction product, discontinuing the addition of methanol to the reaction mass after adding thereto a total amount of methanol corresponding to, by weight, 1300 parts of methanol for each 126 parts of melamine used in forming the said partial reaction product of melamine and formeldehyde, adding n-butanol to the said mass, distilling alcohols from the n-butanol-modified composition, more n-butanol being added thereto during a distillation period of about 2 hours in an amount corresponding approximately to the amount of alcohols distilled, whereby methyl radicals in the methylated melamine-formaldehyde reaction product are replaced by n-butyl radicals and an ungelled liquid composition comprising an n-butylated melamine-formaldehyde resin having a low ratio of formaldehyde to melamine is obtained, the amount of n-butanol which is added to the said reaction mass being, by weight, 600 parts for each 1300 parts of methanol employed, and concentrating the said ungelled liquid composition by heating under reduced pressure until an ungelled liquid composition of a desired higher content of resin solids has been obtained.

PIERREPONT ADAMS.

REFERENCES CITED

The following references are of record in the file of this patent:

UNITED STATES PATENTS

| Number | Name | Date |
|---|---|---|
| 2,197,357 | Widmer | Apr. 16, 1940 |
| 2,213,921 | Sorenson | Sept. 3, 1940 |
| 2,223,327 | Light | Nov. 26, 1940 |
| 2,320,817 | D'Alelio | June 1, 1943 |

FOREIGN PATENTS

| Number | Country | Date |
|---|---|---|
| 207,518 | Switzerland | Feb. 16, 1940 |
| 486,577 | Great Britain | May 30, 1938 |

OTHER REFERENCES

Gams: Helvetica Chimica Acta, vol. 24 (1941), Dec. 13, 1941, pages 302E–318E; translated in British Plastics, February 1943, pages 508–520.